(12) United States Patent
Sudau et al.

(10) Patent No.: US 8,205,734 B2
(45) Date of Patent: Jun. 26, 2012

(54) FRICTION DISK FOR A WET-RUNNING CLUTCH FOR A MOTOR VEHICLE

(75) Inventors: Jörg Sudau, Niederwerrn (DE);
Rüdiger Lotze, Schweinfurt (DE);
Arthur Schröder, Hambach (DE);
Gregor Sueck, Sennfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/009,928

(22) Filed: Jan. 20, 2011

(65) Prior Publication Data

US 2011/0114438 A1    May 19, 2011

Related U.S. Application Data

(62) Division of application No. 11/821,889, filed on Jun. 26, 2007, now Pat. No. 8,113,330.

(30) Foreign Application Priority Data

Jul. 5, 2006  (DE) .................. 10 2006 031 035

(51) Int. Cl.
F16D 13/64 (2006.01)
F16D 13/72 (2006.01)
(52) U.S. Cl. ........................... 192/113.36; 192/107 R
(58) Field of Classification Search ............ 192/113.36, 192/113.22
See application file for complete search history.

(56) References Cited

U.S. PATENT DOCUMENTS

| | | | |
|---|---|---|---|
| 1,860,375 A * | 5/1932 | Winterer et al. | 192/113.36 |
| 2,856,049 A * | 10/1958 | Schjolin | 192/113.36 |
| 3,249,189 A | 5/1966 | Schjolin et al. | |
| 3,366,209 A | 1/1968 | Lindquist et al. | |
| 4,027,758 A * | 6/1977 | Gustavsson et al. | 192/113.36 |
| 4,995,500 A * | 2/1991 | Payvar | 192/107 R |
| 5,094,331 A | 3/1992 | Fujimoto et al. | |
| 5,460,255 A | 10/1995 | Quigley | |
| 5,858,511 A | 1/1999 | Lisowsky | |
| 5,878,860 A | 3/1999 | Pavangat et al. | |
| 5,921,366 A | 7/1999 | Walth et al. | |
| 6,062,367 A | 5/2000 | Hirayanagi et al. | |
| 6,145,645 A | 11/2000 | Kroll et al. | |

(Continued)

FOREIGN PATENT DOCUMENTS

| | | |
|---|---|---|
| DE | 10 2005 030192 | 2/2006 |
| EP | 0 625 647 | 11/1994 |
| EP | 0 874 180 | 10/1998 |
| EP | 0 969 219 | 1/2000 |
| EP | 1 152 160 | 11/2001 |
| EP | 1 473 478 | 11/2004 |
| EP | 1 548 312 | 6/2005 |
| EP | 1 731 784 | 12/2006 |
| WO | WO 9607034 A1 * | 3/1996 |
| WO | WO 02/10605 | 2/2002 |
| WO | WO 02070913 | 9/2002 |

*Primary Examiner* — Rodney Bonck
(74) *Attorney, Agent, or Firm* — Cozen O'Connor

(57) ABSTRACT

A friction disk for a wet-running clutch for a motor vehicle includes a lining carrier ring, provided with connecting areas for connecting the friction disk to a drive side or to a takeoff side of a clutch, and a plurality of friction lining elements, carried on at least one side of the lining carrier ring, fluid flow channels are provided between the friction lining elements which are directly adjacent to each other in the circumferential direction, wherein at least some of the fluid flow channels have different channel widths.

10 Claims, 8 Drawing Sheets

U.S. PATENT DOCUMENTS

| | | |
|---|---|---|
| 6,283,265 B1 * | 9/2001 | Hirayanagi et al. ..... 192/113.36 |
| 6,293,382 B1 | 9/2001 | Nishide et al. |
| 6,345,711 B1 | 2/2002 | Sullivan |
| 6,454,072 B1 | 9/2002 | Merkel et al. |
| 6,766,884 B2 * | 7/2004 | Parsons et al. ............. 188/71.5 |
| 6,910,561 B2 | 6/2005 | Sasse |
| 2002/0079189 A1 * | 6/2002 | Knueve et al. ........... 192/113.22 |
| 2003/0196858 A1 | 10/2003 | Morley et al. |
| 2004/0069586 A1 | 4/2004 | Sasse |
| 2005/0109576 A1 | 5/2005 | Kitahara et al. |
| 2005/0133332 A1 | 6/2005 | Oguri et al. |
| 2006/0090979 A1 | 5/2006 | Asai et al. |
| 2006/0180423 A1 * | 8/2006 | Kos et al. ................. 192/113.36 |
| 2007/0000747 A1 | 1/2007 | Miyazaki |
| 2007/0278062 A1 | 12/2007 | Tsuboi et al. |
| 2008/0034564 A1 | 2/2008 | Oguri et al. |
| 2008/0047786 A1 * | 2/2008 | Nowak et al. ................ 188/71.6 |
| 2009/0211867 A1 | 8/2009 | Miyazaki |

* cited by examiner

FRICTION DISK FOR A WET-RUNNING CLUTCH FOR A MOTOR VEHICLE

CROSS-REFERENCE TO RELATED APPLICATION

This application is a division of U.S. patent application Ser. No. 11/821,889, filed on Jun. 26, 2007, the entirety of which is incorporated herein by reference.

BACKGROUND OF THE INVENTION

1. Field of the Invention

The present invention pertains to a friction disk for a wet-running clutch for a motor vehicle of that type having a lining carrier ring provided with connecting areas for connecting the friction disk to a drive side or to a takeoff side of a clutch, and a friction lining on at least one side of the lining carrier ring.

2. Description of the Related Art

A wet-running friction clutch for a motor vehicle is known from U.S. Pat. No. 6,910,561, in which several friction disks or plates are connected to the input side and several other disks or plates are connected to the output side of the friction clutch, where these friction disks are pressed together so that torque can be transmitted between the drive side and the takeoff side. Various measures are implemented on at least some of these friction disks to ensure that the fluid present in a wet-running clutch of this type, usually oil, will circulate in the area of the friction surfaces which interact frictionally with each other. For this purpose, fluid transport surfaces are provided on some or all of the friction disks. These surfaces act like the vanes of a turbine to circulate the fluid. These fluid transport surfaces can be formed on the friction lining carrier, but they can also be designed as circumferentially oriented surfaces of the friction linings themselves. As a result, flow channels for the fluid to be circulated are formed, these channels extending, for example, from the radially inner area to the radially outer area over the entire surface of the friction disk. A highly uniform pattern of alternating flow channels and frictionally active surface areas is created. As a result of this uniform pattern, however, there arises the danger that, when the system is in rotation, the periodicity of this pattern will cause vibrations to be excited, which have a disadvantageous effect on the behavior of the clutch and which can even be perceptible in the drive train. There is also the problem that, even though these fluid flow channels can carry heat away from the areas of the friction linings immediately adjacent to the channels, they cannot carry heat away from the areas which are farther away from the fluid flow channels, i.e., from the areas over which the fluid does not flow directly. The essentially radially oriented edges which form the boundaries of the flow channels in the circumferential direction, furthermore, form flow barriers for the fluid to be circulated, especially when a clutch of this type is disengaged or partially disengaged. This can lead in turn to slippage torque and thus to an undesirable force-coupling interaction between immediately adjacent friction disks.

A friction disk for a wet-running clutch is known from U.S. Pat. No. 6,454,072, in which grooves which extend from the radially inner area to the radially outer area are provided in each of the friction lining rings to allow the fluid to flow through.

SUMMARY OF THE INVENTION

An object of the present invention is to provide a friction disk for a wet-running clutch for a motor vehicle which offers improved operating behavior.

According to a first aspect of the present invention, in a friction disk for a wet-running clutch for a motor vehicle comprising a lining carrier ring, provided with connecting areas for connecting the friction disk to a drive side or to a takeoff side of a clutch, and a plurality of friction lining elements, supported on at least one side of the lining carrier ring, fluid flow channels are provided between the friction lining elements which are directly adjacent to each other in the circumferential direction, and at least some of the fluid flow channels have different widths.

Because the friction lining is divided into segments, that is, because several friction lining elements are mounted adjacent to each other in the circumferential direction, fluid flow channels are produced between these friction lining elements even though the lining carrier ring is essentially flat. Fluid can thus flow through these channels from the radially inner area to the radially outer area or vice versa. The circumferentially oriented surfaces of the individual friction lining elements can act as fluid transport surfaces. In the design according to the invention, however, there is no uniformly alternating pattern of friction lining elements and fluid flow channels. Instead, the widths of the fluid flow channels vary, and as a result the danger that vibrations can be excited while the system is in rotation is significantly reduced. It should be pointed out here that, when it is stated that the widths of the fluid flow channels differ, this is based on a comparison between the width of one channel and that of another channel in the same radial area, for example. It is not excluded, however, that the width of an individual fluid flow channel can also vary as it proceeds between the radially inner and radially outer area.

According to a second aspect, in a friction disk for a wet-running clutch for a motor vehicle comprising a lining carrier ring, provided with connecting areas for connecting the friction disk to a drive side or to a takeoff side of a clutch, and a plurality of friction lining elements, supported on at least one side of the lining carrier ring, fluid flow channels are provided between the friction lining elements which are directly adjacent to each other in the circumferential direction, and at least one of the friction lining elements is provided with a groove arrangement which is open to the friction surface of that element.

In a friction disk of this type, therefore, the advantageous aspects of the presence of fluid flow channels between individual friction lining elements, which is associated with a very strong flow or circulation of the fluid, is combined with the advantages which arise from the presence of grooves in one or more of the friction lining elements, i.e., the advantages with respect to cooling, the avoidance of slippage torque, and the production of a force generated by the back-pressure within the grooves, which force acts to press directly adjacent friction disks apart in the disengaged state.

Even when this design with a groove pattern in at least one of the friction lining elements is used, it can be especially advantageous with respect to the avoidance of vibrational excitations for at least some the fluid flow channels to have different widths.

The groove arrangement can be designed as, for example, a continuous groove connection leading from a radially inner side to a radially outer side of the minimum of one friction lining element. In an arrangement of this type, particularly effective use is made of the centrifugal forces which occur while the system is in rotation to obtain a defined fluid flow within the groove arrangement.

It is possible, for example, for the groove arrangement to have at least one groove section which extends essentially in a straight line from the radially inner side to the radially outer side.

Alternatively or in addition, it is possible for the groove arrangement to have at least one groove section which departs from a straight line as it proceeds from the radially inner side to the radially outer side. This can be achieved, for example, by providing the minimum of one groove section with at least one curved and/or offset area.

The groove arrangement can be open at the radially inner and at the radially outer side in areas which are offset from each other in the circumferential direction, or the groove arrangement can be designed in such a way that it is open at the radially inner side and at the radially outer side in areas which are essentially not offset with respect to each other in the circumferential direction and has at least one curved and/or offset area between the two sides.

According to another aspect of the inventive friction disk, it is proposed that the groove arrangement produce a continuous groove connection between the two circumferential sides of the minimum of one friction lining element. The two previously mentioned types of groove arrangements, namely, one which produces a continuous radial connection and one which produces a continuous circumferential connection, can, of course, be combined with each other, but each can also be realized by itself.

The groove arrangement can have at least one groove section which proceeds from one of the circumferential sides to the other circumferential side in essentially a straight line or along a circular curve with an essentially constant radius of curvature. Alternatively or in addition, it is possible here for the groove arrangement to have at least one groove section which departs from a straight line and from a circular curve. This can be realized, for example, in that the minimum of one groove section has at least one curved area and/or offset area between the two circumferential sides. The groove arrangement can be open at both circumferential sides in areas offset from each other in the radial direction, or the groove arrangement can be designed in such a way that it is open at both circumferential sides in areas which are essentially not offset from each other in the radial direction and has at least one curved and/or offset area between the two sides.

In another alternative design variant, the groove arrangement can have at least one groove section which is open at one end to one of the circumferential sides of the minimum of one friction lining element and open at the other end to the radially inner side or to the radially outer side of the minimum of one friction lining element.

It is also possible for the groove arrangement to have at least one groove section which is open at one end to the radially inner side or to the radially outer side or to one of the circumferential sides of the minimum of one friction lining element and open at the other end to the same radial end or to the same circumferential end.

It is advantageous in general for the groove arrangement to have at least one groove section which extends essentially in the circumferential direction over part of its length and essentially in the radial direction over another part of its length. An arrangement of this type necessarily causes the fluid to change direction within the minimum of one groove section. As a result of the throttling effect thus caused, this change of direction offers the advantage of an increase in the fluid pressure. This generates a force which acts to press the individual friction disks away from each other.

So that the advantages produced by a groove arrangement or groove pattern can be made available essentially over the entire service life of a friction disk of this type, it is proposed that the groove arrangement have at least certain areas where the depth of the groove is essentially the same as the thickness of the minimum of one friction lining element. It is possible, for example, for the groove arrangement to have at least one groove section which divides the minimum of one friction lining element into two friction lining element segments.

According to a third aspect, in a friction disk for a wet-running clutch for a motor vehicle comprising a lining carrier ring, provided with connecting areas for connecting the friction disk to a drive side or to a takeoff side of a clutch, and a plurality of friction lining elements, supported on at least one side of the lining carrier ring, at least one of the friction lining elements has at least one fluid holding opening.

Providing a fluid holding opening means, first, that fluid can be held in the area of a friction lining element, which makes it possible for heat to be stored in the fluid and for this heat to be carried off with the fluid. As a result of these types of openings, furthermore, baffle surfaces are produced, which again lead to an increase in pressure and thus to a force which acts to push the friction disks away from each other. It is possible, for example, for the minimum of one fluid holding opening to be open at a radial side or at a circumferential side of the minimum of one friction lining element.

A fluid holding opening of this type can have a width which decreases as it proceeds circumferentially or radially away from the side of the friction lining element at which it is open.

It is also possible for the minimum of one fluid holding opening to be open neither at a circumferential side nor at a radial side of the minimum of one friction lining element.

So that the effect produced by a fluid holding opening can be maintained over the entire service life of a friction clutch in this type of design as well, it is proposed that the depth of the minimum of one fluid holding opening be essentially the same as the thickness of the minimum of one friction lining element.

Even when a friction disk is designed in this way, it is still possible to provide fluid flow channels between friction lining elements which are immediately adjacent to each other in the circumferential direction, where preferably the widths of at least some of the fluid flow channels are different.

The invention also pertains to a wet-running friction clutch in which at least one inventive friction disk is provided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
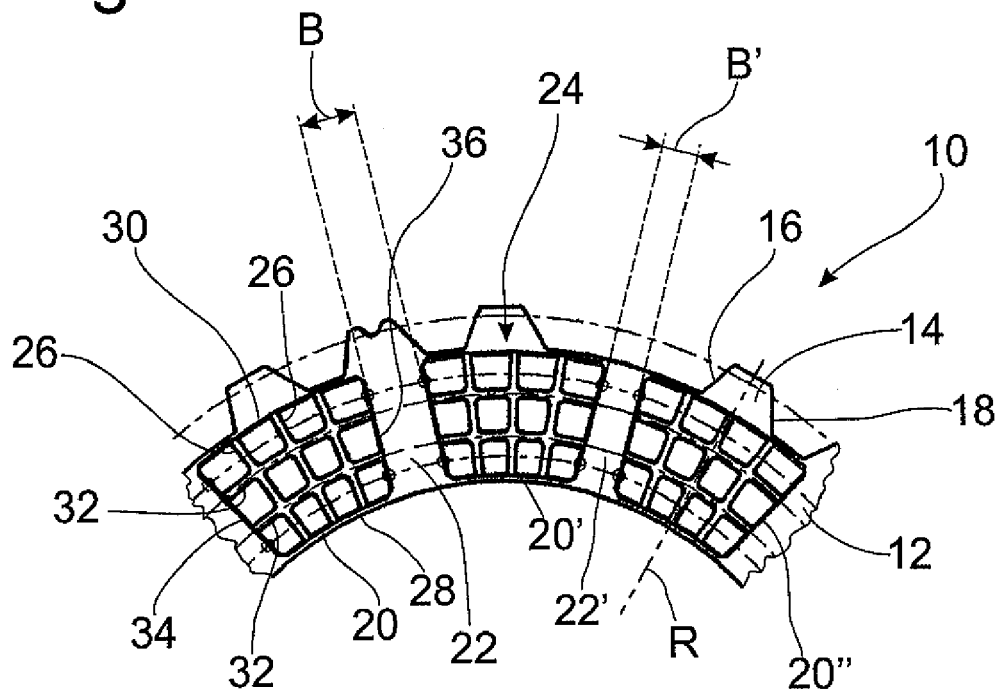
FIG. 1 shows a partial axial view of a friction disk for a wet-running friction clutch.

FIG. 1 shows an axial view of only part of a friction disk 10 of a wet-running friction clutch for the drive train of a motor vehicle. The friction disk 10 comprises a lining carrier ring 12, which can be made of steel or sheet metal material, for example, and which, in the example shown here, carries on its outer circumferential area a plurality of projection-like connecting areas 14. By means of these connecting areas, the friction disk 10 can be brought into engagement for rotation in common with corresponding components of a friction clutch so that torque can be transmitted, but the connecting areas also ensure that a friction ring of this type has a certain freedom of movement in the axial direction, so that clutch-engaging and clutch-disengaging operations can be executed. It can be seen in FIG. 1 that these connecting areas 14 have circumferentially oriented flanks 16, 18, which can be at different angles to a radial line R in order to achieve different support interactions for operation in pull mode and for operation in push mode.

This general design of the lining carrier ring as described above and as can be seen in FIG. 1 can also be realized, of course, in the embodiments of a friction disk 10 to be described in the following.

It can also be seen in FIG. 1 that, on the visible side of the lining carrier ring 12, the friction disk 10 comprises a plurality of friction lining elements 20, 20', and 20" arranged in a row around the circumference. These friction lining elements 20, 20', 20", which are essentially identical to each other in design, are attached to the lining carrier ring 12 by means of adhesive bonding or riveting, for example. They are mounted a certain circumferential distance away from each other so that fluid flow channels 22, 22', etc, are formed between the friction lining elements 20, 20', 20" which are directly adjacent to each other in the circumferential direction. By positioning the friction lining elements 20, 20', 20" on the lining carrier ring 12 in different ways, different circumferential distances and correspondingly different channel widths B, B', etc., are obtained. As can be seen in FIG. 1, the fluid flow channels 22, 22' can have a more-or-less constant width B, B' in the radial direction. Providing the fluid flow channels 22, 22' with different widths B, B' as measured, for example, at a predetermined radius has the result that, when the system is in rotation, the vibrations which would be excited if the individual friction lining elements 20, 20', 20" were spaced uniformly is avoided. For this purpose, all of the fluid flow channels formed between the friction lining elements of a friction disk 10 can have different channel widths, for example, or it is possible to define two different channel widths and to have these alternate in an irregular pattern.

The fluid flow channels 22, 22' have the essential task of making possible a relatively large volume flow rate in the radial direction. When the system is in rotation, this volume flow rate is generated or supported by the surfaces of the friction lining elements 20, 20', 20" which are present at the circumferential sides of the individual friction lining elements 20, 20', 20" and which are facing essentially in the circumferential direction. In this way, a fluid circulation can be generated in the area of the frictionally interacting friction disks, and this increases the amount of heat which can be dissipated. Thus the areas of the friction lining elements 20, 20', 20" near the fluid flow channels 22, 22' are cooled in particular. Areas farther away in the circumferential direction, however, do not participate in this cooling action or do so to only a lesser degree. To achieve a stronger cooling effect in the areas of the friction lining elements 20, 20', 20" farther away from the fluid flow channels 22, 22' as well, the friction lining elements 20, 20', 20" have a groove arrangement designated in general by the number 24. This groove arrangement 24 is open to the friction surface in question, i.e., to the surface visible in FIG. 1 of the friction lining elements 20, 20', 20", and the fluid present in a wet-running friction clutch can flow through these grooves.

The special design of the groove arrangement 24 shown in FIG. 1 will be explained in greater detail below on the basis of the friction lining element 20. It is obvious that the other friction lining elements 20', 20" and other friction lining elements not illustrated here can have a groove arrangement 24 of the same design.

It can be seen that the groove arrangement 24 in the design variant shown in FIG. 1 has a plurality of essentially radial groove sections 26; here there are three such sections. They are laid out in such a way that they pass continuously from the radially inner side 28 to the radially outer side 30 of the friction lining element 20 and thus are open at these radial sides 28, 30. The effects of centrifugal force in particular have the result that, when the system is in rotation, fluid is forced to flow through these essentially radial groove sections 26. Because the part of each of these groove sections 26 which is open at the radially inner side 28 is in the same circumferential area as the part which is open at the radially outer side 30, the fluid flowing through the groove section 26 in question can proceed more-or-less exactly in the radial direction without having to overcome any significant flow resistance.

The friction lining element 20 also has several, here, two, groove sections 32 extending more-or-less in the circumferential direction. These groove sections 32 extend without interruption between the two circumferential sides 34, 36 of the friction lining element 20 and are open in the circumferential direction in the same radial areas. The groove sections 32 have a slightly curved shape; that is, they are curved in such a way that the radius of curvature corresponds to the radius on which the groove section 32 in question lies.

As a result of the design of the lining elements 20, 20', 20" shown in FIG. 1 with an essentially grid-like pattern of the groove sections 26 and 32, various advantages are obtained during the operation of the clutch. First, the fluid flowing through the groove arrangement 24 can carry heat away from the areas of the friction lining elements 20, 20', 20" situated some distance away from the fluid flow channels 22, 22'. Although the individual groove sections 26, 32 are essentially straight in the one case and curved in the circumferential direction in the other, disturbances are present at the points of intersection, at each of which the radial and circumferential flow components interact with each other. The flow resistances thus produced increase the fluid pressure in the groove sections 26, 32 in question, which is advantageous during the transition to the disengaged state and also after the disengaged state has been reached. This increased fluid pressure is able to act because the groove arrangement 24 is open to the friction surface in question and also to the immediately adjacent friction disk and thus generates a force which acts to push the two disks away from each other. That is, in the disengaged state, the friction disks are kept effectively a certain distance apart by the fluid pressure which has been increased in this way. Undesirable frictional interactions can thus be avoided.

A problem with friction disks of this type, especially disks with edges which extend in the radial direction, is that flow deflections and turbulence are generated when the fluid is in a comparatively cold and thus viscous state. Because the directly adjacent friction disks are comparatively close together even when disengaged, these deflections and turbulences can lead to slippage torque. The generation of slippage torque is counteracted in the case of the embodiment shown in FIG. 1, however, because the edge areas of the friction lining elements 20, 20', 20" forming the boundaries of the radially extending groove sections 26 in the circumferential direction are interrupted, namely, by the circumferentially-extending groove sections 32.

Various additional embodiments of friction disks are described in the following, which differ primarily with respect to the design of the friction lining elements used. Only these differences, therefore, will be discussed, and it is pointed out that, primarily with respect to the design of the lining carrier ring 12 and the width variation of the fluid flow channels 22, 22', etc., the friction disks described in the following can be designed as already described on the basis of FIG. 1.

It should also be pointed out that the special design of the friction lining elements in the various embodiments is always described in reference to a single one of the illustrated friction lining elements, but it is obvious that the other friction lining elements can also be of the same design. It must also be noted that it is obviously also possible to combine friction lining elements with groove arrangements of different designs on one and the same friction disk. It should also be noted that these types of friction lining elements can be provided on only one side of the lining carrier ring, but obviously these types of friction lining elements with fluid flow channels formed between them can also be present on both sides of a lining carrier ring.

Figure 2:
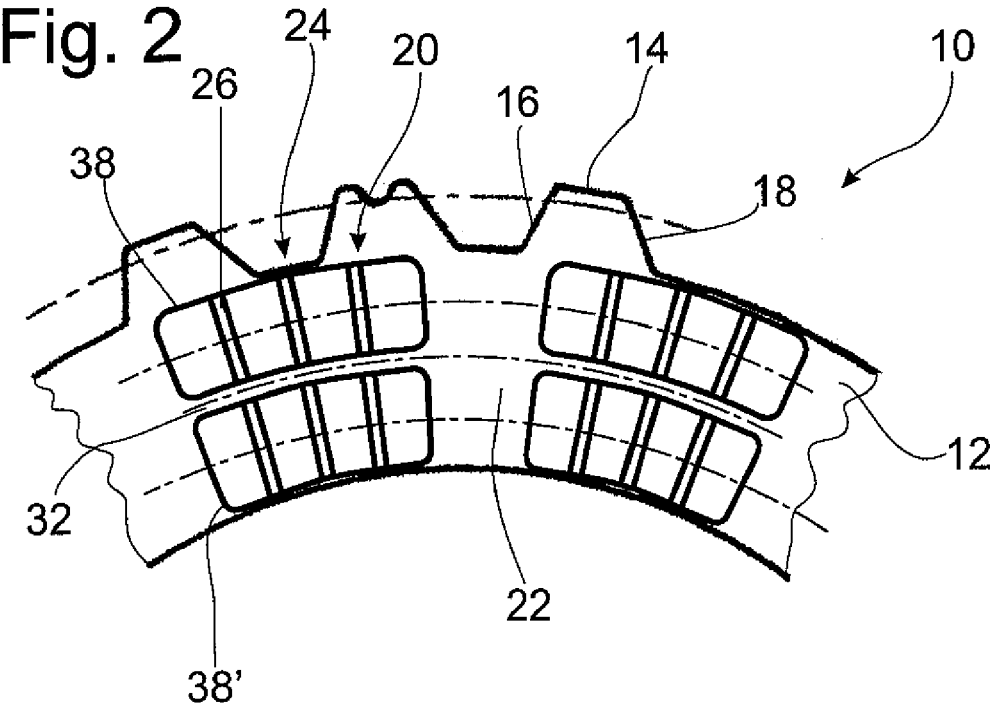
FIG. 2 shows a view corresponding to FIG. 1 of an alternative embodiment of a friction disk.

The embodiment shown in FIG. 2 corresponds to that already described on the basis of FIG. 1 with respect to the layout of the groove sections 26, 32. The difference is that the single groove section 32 present here extending in the circumferential direction is deeper than the groove sections 26. In particular, this depth is calculated so that it separates the friction lining element 20 into two friction lining element segments 38, 38', which are attached independently of each other to the lining carrier ring 12. Here, therefore, the depth of the groove section 32 is equal to the thickness of the friction lining element 20, whereas the groove sections 26 in the embodiments according to FIG. 1 and FIG. 2 are not quite as deep. This greater depth reduces the flow resistance even more, especially the resistance in the circumferential direction.

Figure 3:
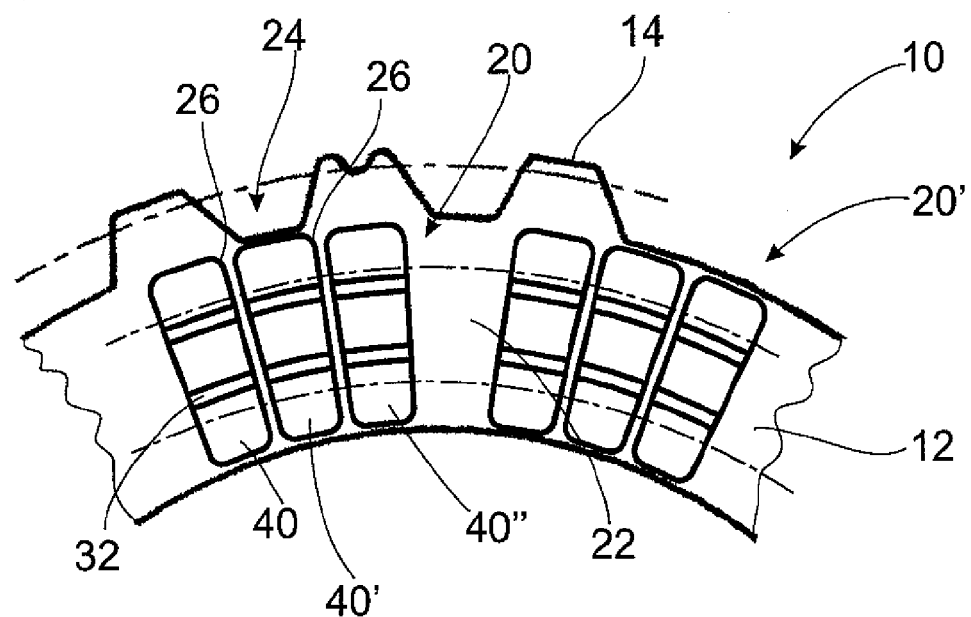
FIG. 3 shows a view corresponding to FIG. 1 of an alternative embodiment of a friction disk.

In the embodiment shown in FIG. 3, the friction lining element 20 is divided into three friction lining element segments 40, 40', 40" by the now deeper radially oriented groove sections 26, with the result that, because of the greater depth of these groove sections 26, a much-reduced flow resistance can be provided in the radial direction.

It is obvious that the various aspects of the design of the groove sections shown in FIGS. 2 and 3 with depths which extend through the entire axial thickness of the friction lining element in question can also be combined with each other. This is obviously independent in principle of how many of the essentially radial groove sections 26 or of the essentially circumferential groove sections 32 are present. It is also possible for only certain areas of the groove sections 26 and/or 32 to be of greater depth and for the other areas be of lesser depth, which means that the friction lining element 20 would not be divided into several separate segments which must be fastened independently to the lining carrier ring 12.

Figure 4:
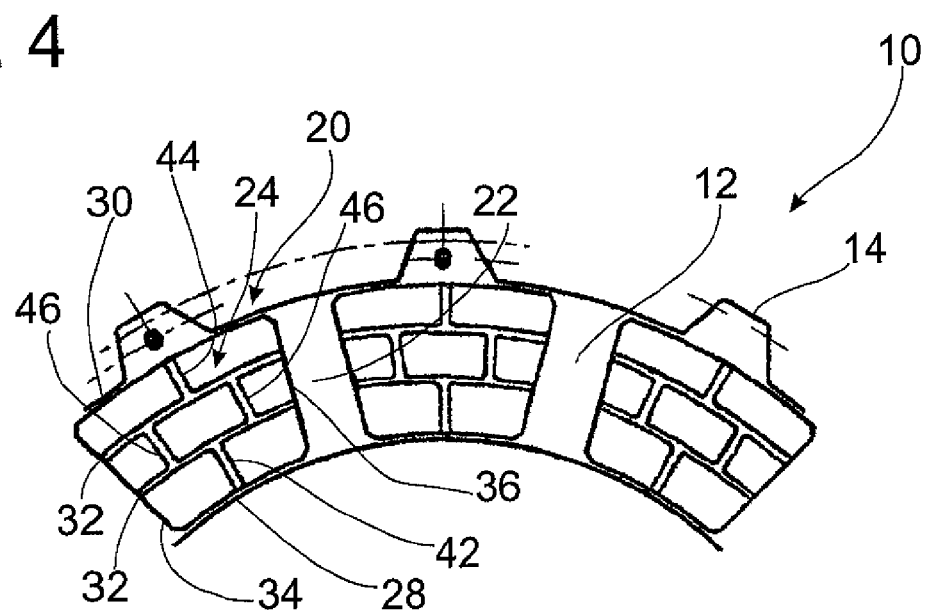
FIG. 4 shows a view corresponding to FIG. 1 of an alternative embodiment of a friction disk.

FIG. 4 shows an embodiment in which two more-or-less circumferentially-extending groove sections 32 are again present. There is, however, no groove section present which extends in an essentially straight or uninterrupted line in the radial direction, i.e., proceeding from the radially inner area to the radially outer area or vice versa. Instead, shorter groove sections 42, 44 are provided, each of which is open at the radially inner side 28 or radially outer side 30 and leads to one of the adjacent circumferential groove sections 32. These groove sections 42, 44 are then connected to each other by additional more-or-less radially extending groove sections 46, which are offset circumferentially from the grooves sections 42, 44, which are open radially at the inside or radially at the outside. Thus, looking in the radial direction, an arrangement continues to be present in which the groove arrangement is open in the same circumferential position at the radially inner side 28 and radially outer side 30, but in an intermediate area there is one or more offset areas present, in which the fluid is forced to deflect, which brings with it the previously explained advantage that, because of the increase in pressure caused by this throttling effect, an action which pushes the individual friction disks 10 apart is produced. Here, too, a straight, continuous edge area in the radial direction is avoided, so that the slippage torques which might occur especially when temperatures are low and the fluid is correspondingly more viscous can be reduced.

Figure 5:
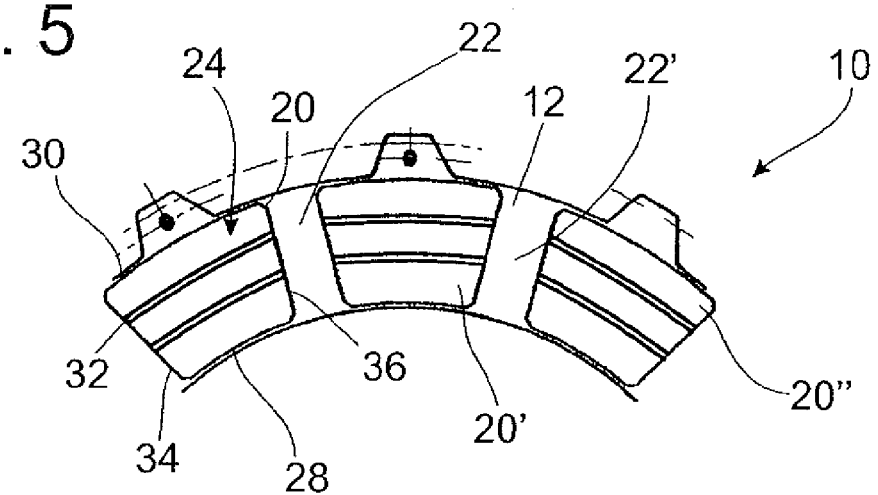
FIG. 5 shows a view corresponding to FIG. 1 of an alternative embodiment of a friction disk.

FIG. 5 shows an embodiment in which the friction lining element 20 or all of the friction lining elements have only the essentially circumferential groove sections 32, which therefore establish a direct flow connection between the two circumferential sides 34, 36. Because there is practically no additional integrated throttling action, a very pronounced flow with a corresponding heat-dissipating effect can be ensured.

Figure 6:
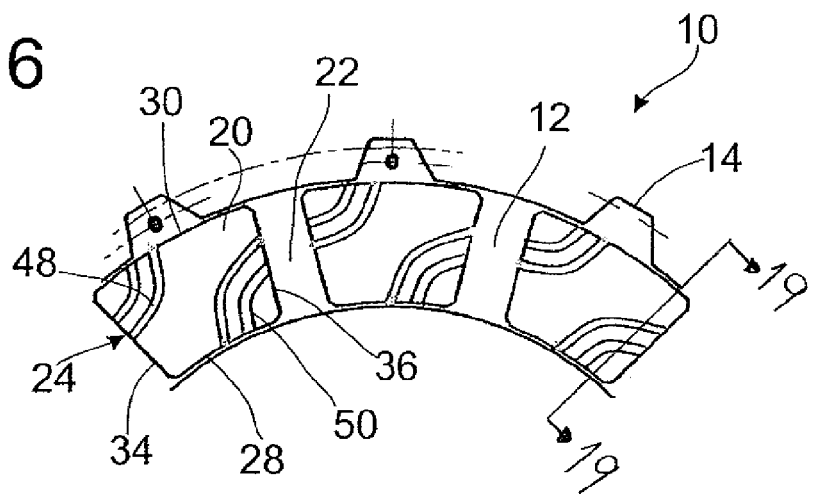
FIG. 6 shows a view corresponding to FIG. 1 of an alternative embodiment of a friction disk.

FIG. 6 shows an embodiment in which the groove sections 48 of a first group of sections are open at one end to the circumferential side 34 and at the other end to the radially outer side 30. Groove sections 50 of a second group of grooves lie essentially at the diametrically opposite side of the friction lining element 20, one end being open to the circumferential side 36, the other end to the radially inner side 28. These groove sections 48, 50 are therefore provided basically in such a way that, starting from a circumferential side, they have an approximately or primarily circumferential part and then, after an inflection, continue from there with an approximately or primarily radial part. These groove sections are closed except at the ends of the grooves. Here, too, very good flow is guaranteed, and because of the presence of the inflected or curved area, the previously mentioned throttling effect and the resulting increase in pressure can be produced.

Figure 7:
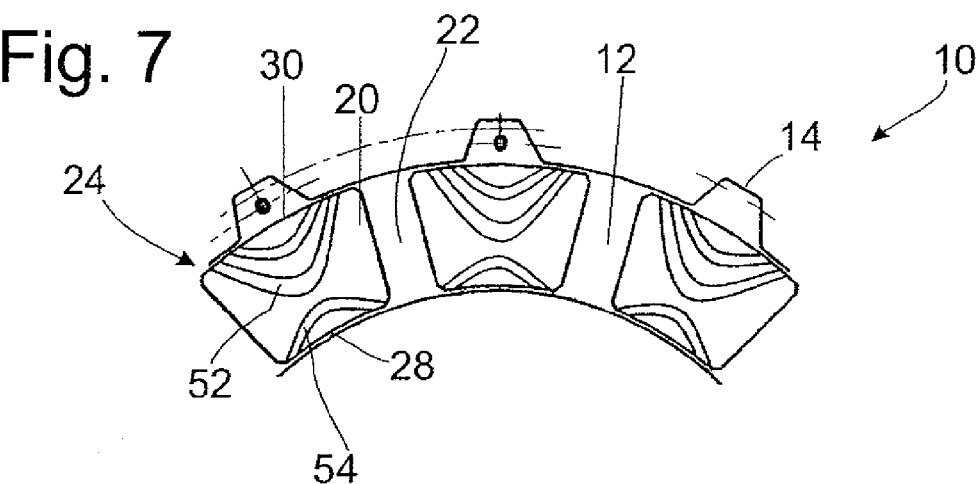
FIG. 7 shows a view corresponding to FIG. 1 of an alternative embodiment of a friction disk.

In the case of the embodiment shown in FIG. 7, groove sections 52 are present, both ends of which are open to the radially outer side 30, and a groove section 54 is present, both ends of which are open to the radially inner side 28. Because the ends of the grooves of sections 52, 54 do not intersect, which is also true in the embodiment of FIG. 6, and because they are on the same radial level, centrifugal force cannot produce a pressure difference which could ensure flow through the grooves. Because of the existing rotation or relative movement between the friction disk 10 in question and the fluid surrounding it, however, the fluid is nevertheless forced to flow through these groove sections 52, 54, and through the presence of the deflection area or curvature, a throttling effect is again generated.

Figure 8:
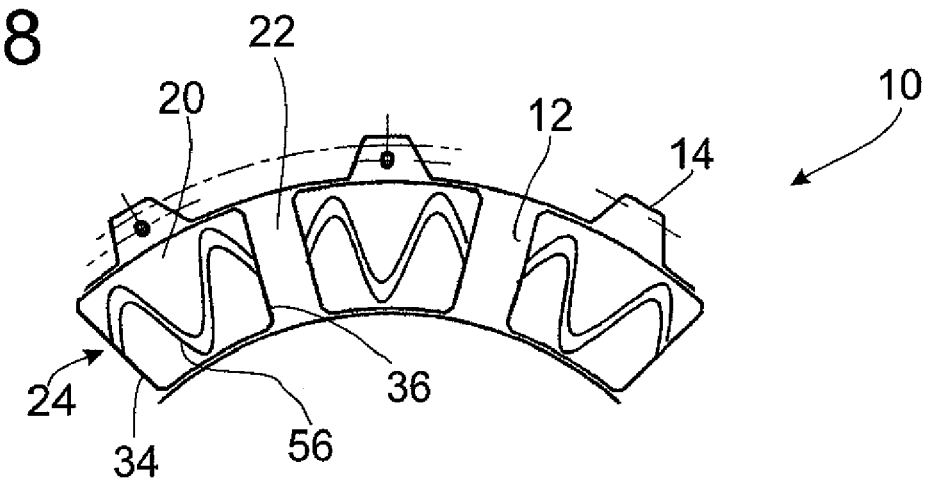
FIG. 8 shows a view corresponding to FIG. 1 of an alternative embodiment of a friction disk.

FIG. 8 shows an embodiment of a friction disk 10 in which the friction lining element 20 or all of the friction lining elements 20 have a groove section 56 with a wave-like shape, which is open at both circumferential sides 34, 36, preferably on the same radial level. Here, therefore, a single groove section 56 passes through a comparatively large area of the friction lining element 20, which contributes to good heat dissipation. The deflections present in the groove section, furthermore, cause the pressure to increase. It is obvious that here, too, several of these wavy groove sections could be provided more-or-less parallel to each other.

Figure 9:
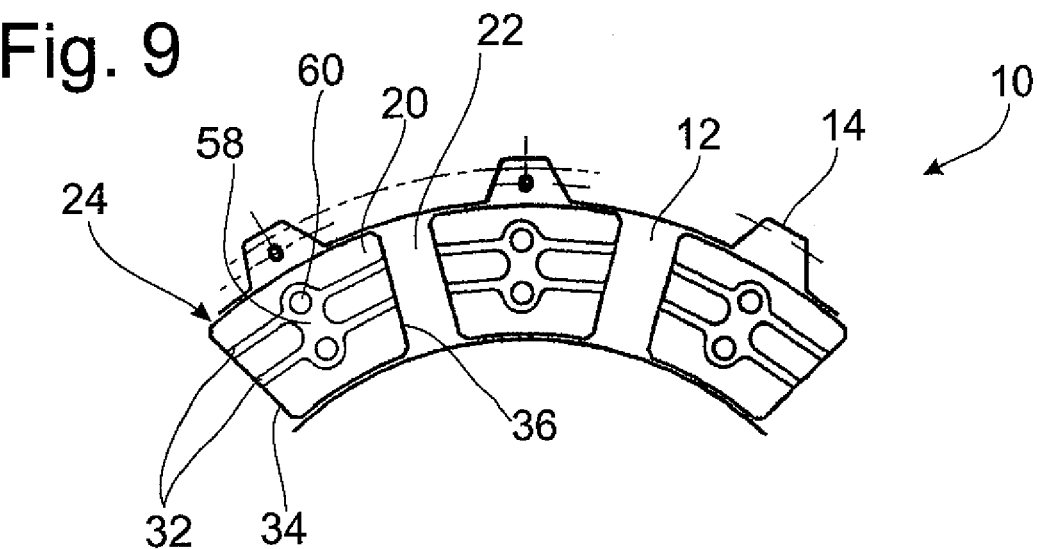
FIG. 9 shows a view corresponding to FIG. 1 of an alternative embodiment of a friction disk.

In the embodiment shown in FIG. 9, the more-or-less circumferential groove sections 32 lead to an expanded area or open area 58, which connects the groove sections to each other in the circumferentially central area of the friction lining element 20. In this open area 58 connecting the groove sections 32 together, deflection islands 60 are present, which ensure that the fluid flowing through the individual groove sections 32 is forcibly deflected upon entering the open area 58, and turbulence is created with a corresponding increase in pressure. These island areas 60 are therefore preferably arranged in such a way that they lie in the area of the groove section 32 containing the open area 58 in question.

Figure 10:
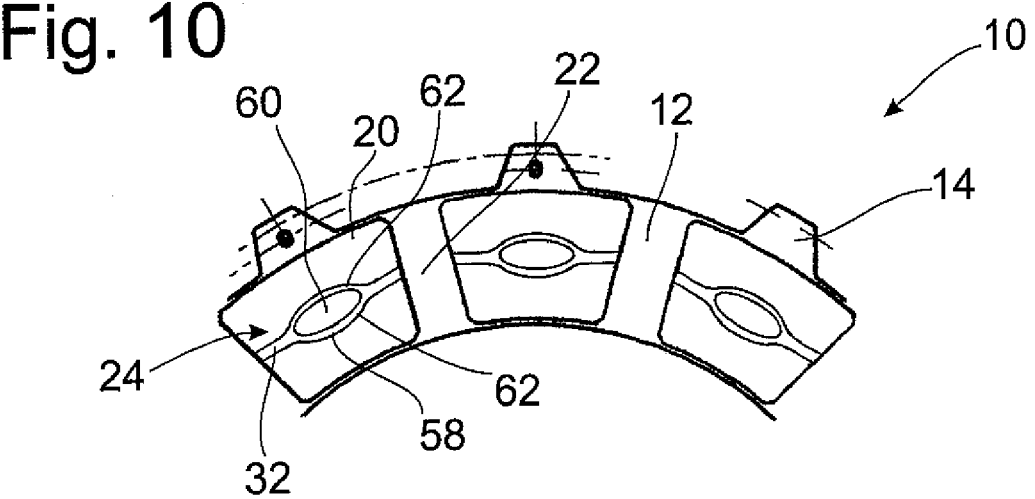
FIG. 10 shows a view corresponding to FIG. 1 of an alternative embodiment of a friction disk.

In the embodiment shown in FIG. 10, only one more-or-less circumferential groove section 32 is present, which, in its circumferentially central area, also has an expanded or open area 58 with an island area 60 positioned in it to deflect the fluid. Here, therefore, the groove section 32 divides in its central area, for example, into two branches 62, 62, which can be dimensioned in such a way that their total flow cross section is the same as that which is present in the unbranched area of the groove section 32.

Figure 11:
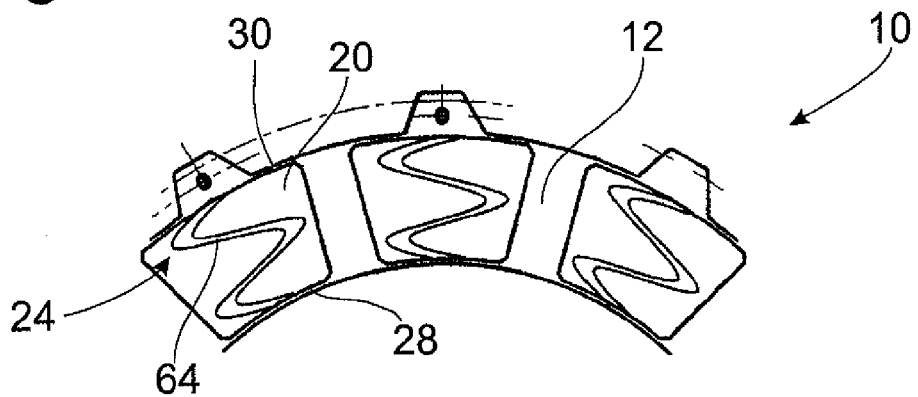
FIG. 11 shows a view corresponding to FIG. 1 of an alternative embodiment of a friction disk.

FIG. 11 shows an embodiment of a friction disk 10 in which a wave-like groove section 64, which connects the radially inner side 28 to the radially outer side 30, is present in the friction lining element 20. A very strong flow of fluid passes through this section especially when the system is rotating because of the prevailing centrifugal forces, and because of the avoidance of any edge areas extending precisely in the radial direction, the danger of the occurrence of slippage torque can be avoided, especially at low temperatures.

Figure 12:
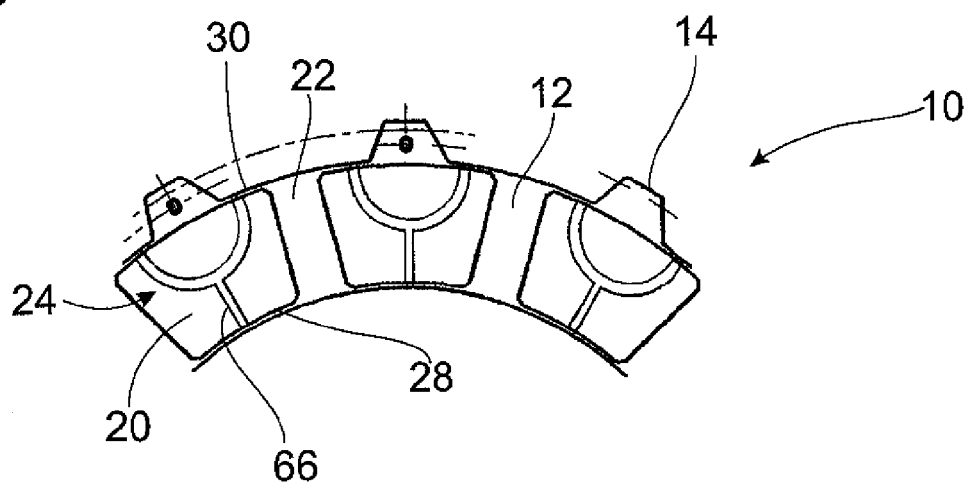
FIG. 12 shows a view corresponding to FIG. 1 of an alternative embodiment of a friction disk.

In the embodiment shown in FIG. 12, the radially inner side 28 is again connected to the radially outer side 30 by a groove section 66, which extends more-or-less radially in the radially inner area and then splits in a more-or-less radially central area of the friction lining element 20 into two branches in the form of quarter-circles, which extend radially outward. It can be seen here that the opening of the groove section 66 radially on the inside is offset from the openings radially on the outside. Here, again, overly long radial edges or edges which extend over the entire radial area of the friction lining element 20 are avoided as completely as possible.

Figure 13:
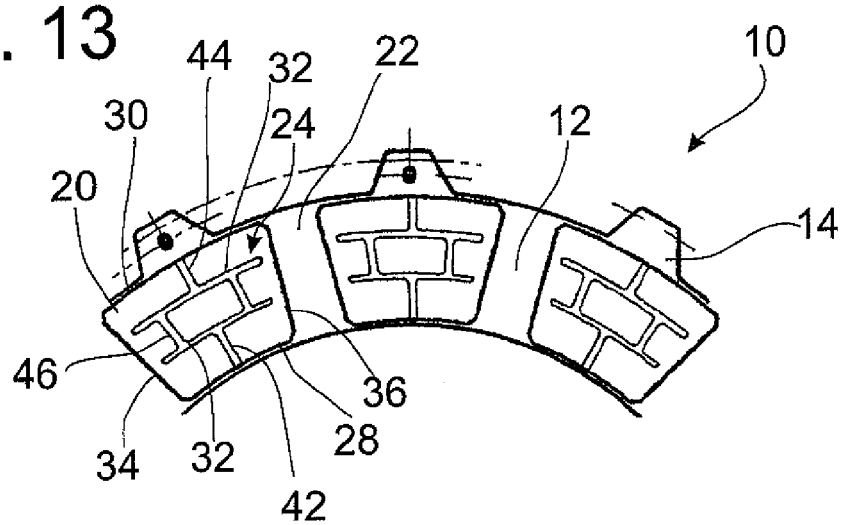
FIG. 13 shows a view corresponding to FIG. 1 of an alternative embodiment of a friction disk.

FIG. 13 shows an embodiment which corresponds to the previous embodiment described on the basis of FIG. 4 in its essential aspects. The difference is that the more-or-less circumferential groove sections 32 are not open at the circumferential sides 34, 36. They terminate shortly before these circumferential sides 34, 36, so that here the flow will proceed only in the radial direction, that is, from the radially inner side 28 to the radially outer side 30, namely, again through the offset groove sections 42, 44, and 46.

Figure 14:
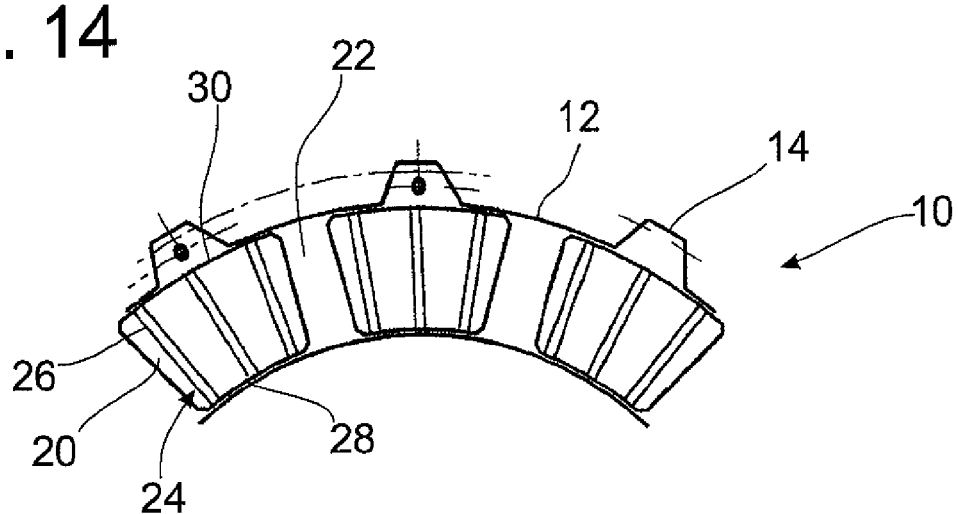
FIG. 14 shows a view corresponding to FIG. 1 of an alternative embodiment of a friction disk.

In the embodiment shown in FIG. 14, the friction lining element 20 has three essentially radial groove sections 26, which connect the radially inner side 28 and the radially outer side 30 to each other and which thus allow an essentially unthrottled radial flow with a correspondingly good cooling effect. It should be emphasized that, of course, here, too, the depth of the grooves can be such that the sections 26 extend over only part of the axial thickness of the friction lining element 20. Alternatively, as previously explained with reference to FIGS. 2 and 3, at least one of the groove sections 26 can be so deep here, too, that it divides the friction lining element 20 into segments. The same applies also, of course, to the other embodiments described.

Figure 15:
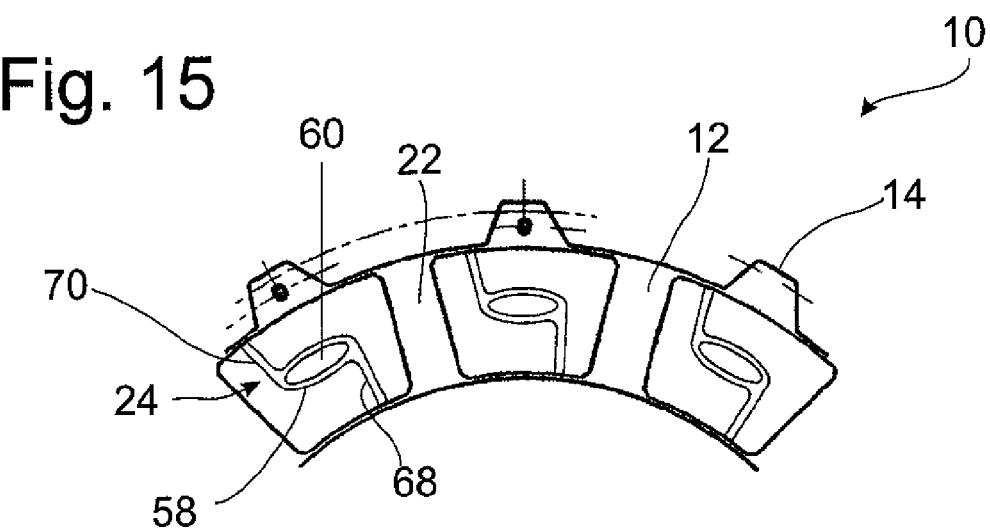
FIG. 15 shows a view corresponding to FIG. 1 of an alternative embodiment of a friction disk.

In FIG. 15, two groove sections 68, 70, which are offset from each other in the circumferential direction, lead out into an open area 58, in which again there is an island area 60, which increases the deflection of the flow. Here, therefore, the flow departs from the strictly radial direction, and a forced deflection in the circumferential direction is produced, which is advantageous especially with respect to the generation of a pressure increase and a corresponding separating effect on the friction disks 10.

Figure 16:
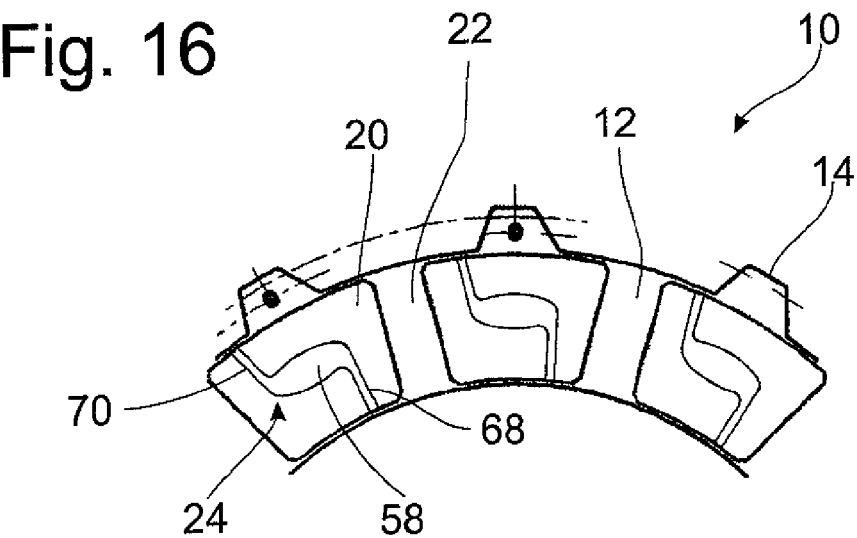
FIG. 16 shows a view corresponding to FIG. 1 of an alternative embodiment of a friction disk.

The embodiment shown in FIG. 16 corresponds more-or-less to that shown in FIG. 15. It is possible to see here again the two groove sections 68, 70, which lead to the expanded or open area 58, which now does not have an island area. Here, therefore, in the central area of the friction lining element 20, there is a relatively large storage volume for fluid, which, as a result of the slower velocity of the fluid in this expanded area 58, leads to a stronger thermal interaction and thus to a better uptake of heat by the fluid.

Figure 17:
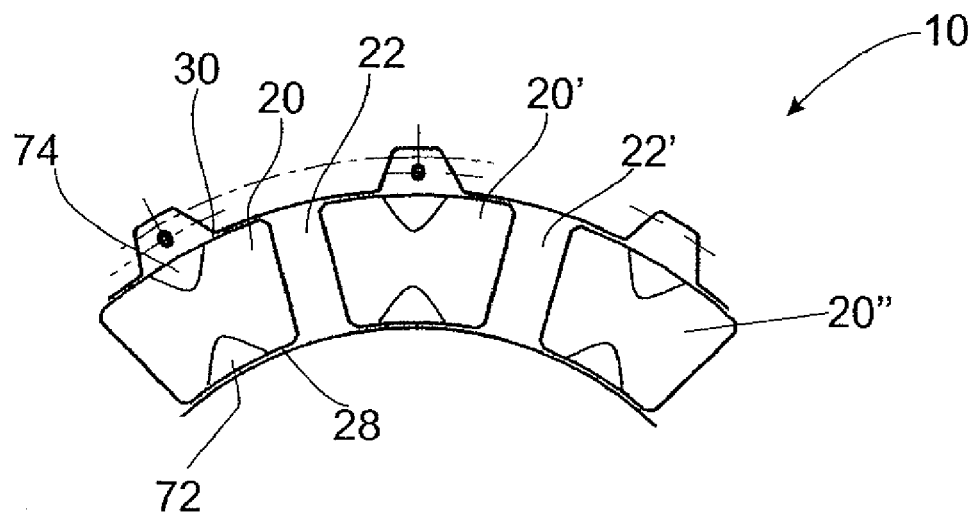
FIG. 17 shows a view corresponding to FIG. 1 of an alternative embodiment of a friction disk.

FIG. 17 shows an embodiment in which open areas 72, 74 are located in the friction lining element 20 or in all of the friction lining elements shown. These areas are provided on the radially inner side 28 and on the radially outer side 30 and are open to the radial side in question. In the radial direction, these open areas expand radially inward in the one case and radially outward in the other from the base of the opening. The provision of these types of open areas has the result that, first, fluid can enter somewhat farther into the interior area of the friction lining element, and second, vortex effects and pressure increases are generated, which support the separation of the directly adjacent friction disks 10.

Figure 18:
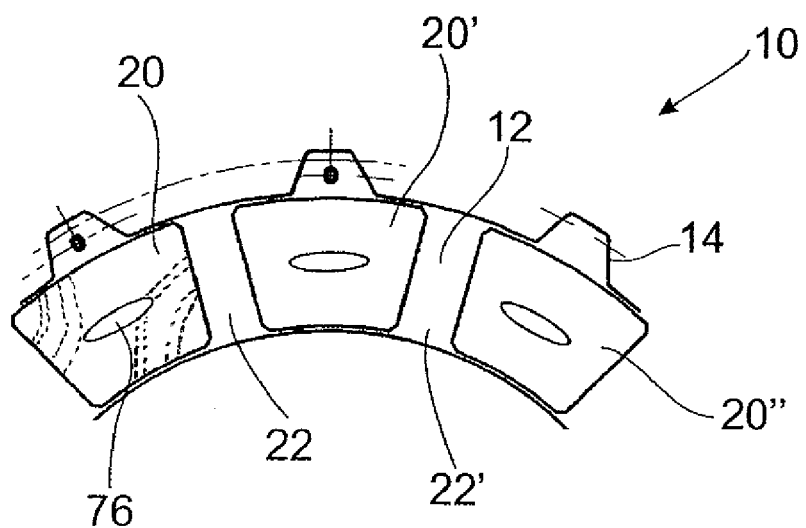
FIG. 18 shows a view corresponding to FIG. 1 of an alternative embodiment of a friction disk.

In the embodiment shown in FIG. 18, an open area 76 is present in the more-or-less central area of the friction lining 20. This area has no connection of any kind to the circumferential or radial sides. In the engaged state, therefore, fluid is trapped in this open area 76 and can absorb heat. Then, when the clutch is disengaged, this heat can be carried away very quickly as the fluid flows out of the open area 76. These types of open areas also generate vortices and therefore increase the pressure, which supports the separation of directly adjacent friction lining elements.

Figure 19:
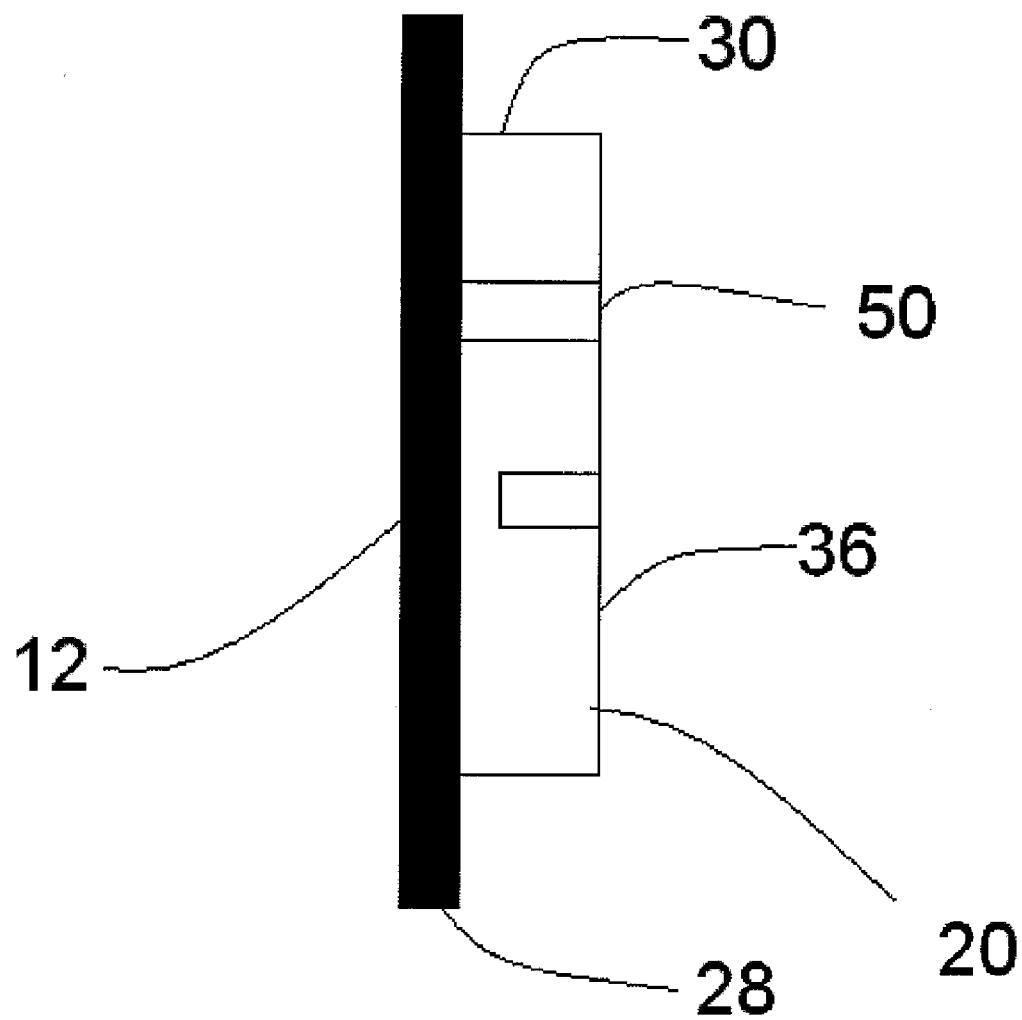
FIG. 19 is a cross section of the friction disk of FIG. 6 along line 19-19.

As shown in FIG. 19, groove sections 50 are open to the circumferential side 36. The two grooves are shown having different depths. One of the grooves, the groove proximate to radially inner side 28 is of a first depth and the second groove proximate the radially outer side 30 has a depth, which is equal to the thickness of the friction-lining element 20. Because the second groove is equal to the thickness of the friction lining element 20 the groove section divides the friction lining element 20 into two friction lining element segments. In FIG. 18, the grooves 50a are shown in dotted lines connecting to fluid holding opening 76.

What is claimed:

1. A friction disk for a wet-running clutch in a motor vehicle, the friction disk comprising:
    a lining carrier ring having opposed faces and connecting areas for connecting to one of a drive side and a takeoff side of a clutch; and
    a plurality of circumferentially adjacent friction lining elements on at least one face of the carrier ring, said plural friction lining elements being separated by fluid flow channels, each friction lining element having a groove arrangement that deviates from a straight line extending from a radially inner side of the friction lining element to a radially outer side of the friction lining element that has:
        a first groove section that extends perpendicularly from the radially inner side to a first inner end;
        a second groove section that extends perpendicularly from the radially outer side to a second inner end;
        at least one third groove section circumferentially offset from the first and second groove sections that extends radially between respective offset circumferential locations of the first and second inner ends of the first and second groove sections; and
        at least two fourth groove sections extending circumferentially that connect the respective first and second inner ends of the first and second groove sections to respective ends of the at least one third groove section, the fourth groove sections extending circumferentially beyond the at least one third groove section towards a respective circumferential edge of the friction lining element.

2. The friction disk of claim 1, wherein the at least two fourth groove sections have a curved area.

3. The friction disk of claim 1, wherein the groove arrangement is open at the radially inner side and the radially outer side in areas which are not circumferentially offset.

4. The friction disk of claim 1, wherein the first and second groove sections are not offset from each other circumferentially, said groove arrangement having at least one of a curved area and an offset area between circumferential sides of the friction lining element.

5. The friction disk of claim 1, wherein no combination of groove sections extends in an essentially straight or uninterrupted line in a radial direction.

6. The friction disk of claim 1, wherein the at least two fourth groove sections comprises at least one circumferential groove section closed at respective circumferential sides.

7. The friction disk of claim 1, wherein the at least two fourth groove sections comprises at least one circumferential groove section open at respective circumferential sides.

8. A friction disk for a wet-running clutch in a motor vehicle, the friction disk comprising:
    a lining carrier ring having opposed faces and connecting areas for connecting to one of a drive side and a takeoff side of a clutch; and
    a plurality of friction lining elements on at least one face of the carrier ring, circumferentially adjacent said friction lining elements being separated by fluid flow channels, each friction lining element having a groove arrangement that has at least one groove section that deviates from a straight line, the groove arrangement having a wave-like shape,
        wherein the wave-like groove arrangement is open at both circumferential sides of the friction lining element.

9. The friction disk of claim 8, wherein the openings of the wave-like groove arrangement are at a same radial level.

10. The friction disk of claim 8, wherein the wave-like groove arrangement is configured to cause a pressure of a liquid in the wave-like groove arrangement to increase.

* * * * *